UNITED STATES PATENT OFFICE.

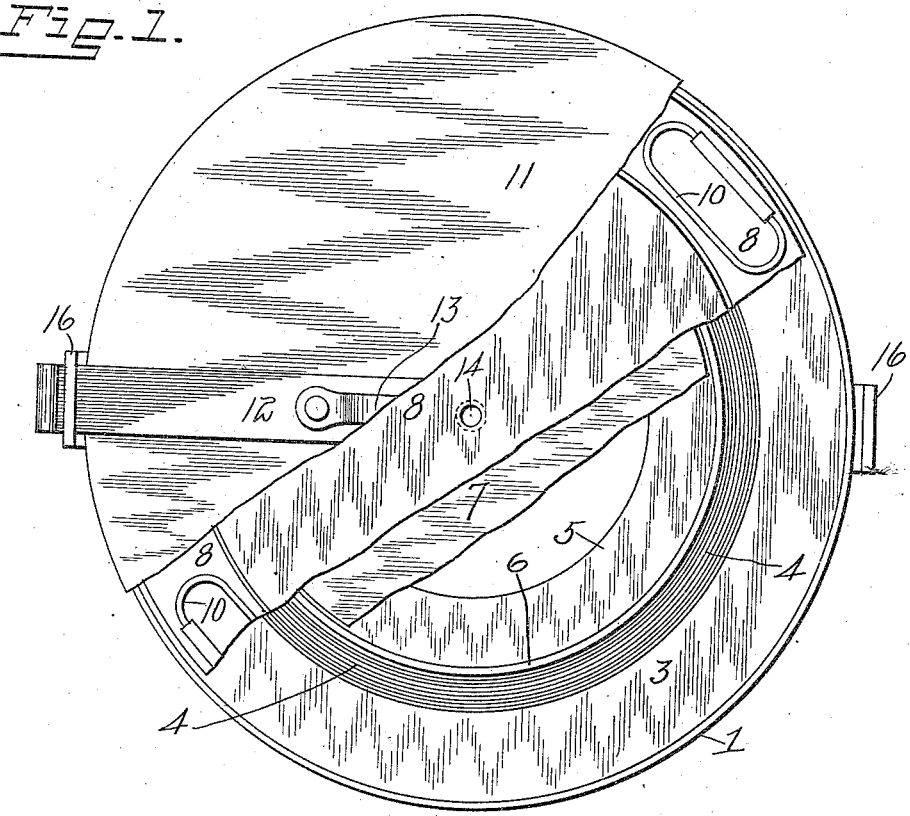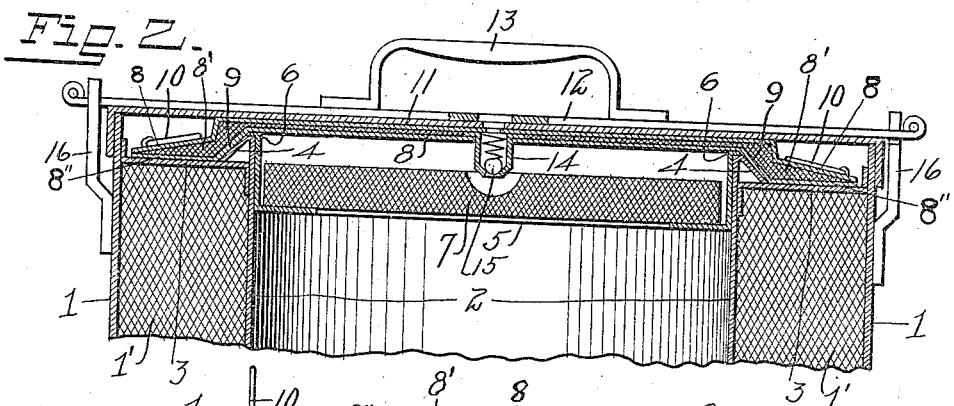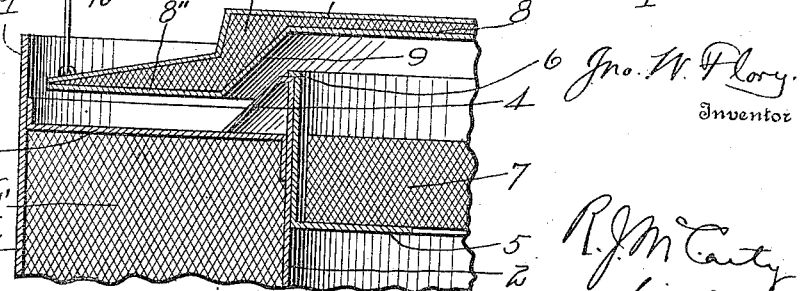

JOHN W. FLORY, OF DAYTON, OHIO.

FIRELESS COOKER.

971,260.  Specification of Letters Patent. Patented Sept. 27, 1910.

Application filed March 23, 1910. Serial No. 551,120.

*To all whom it may concern:*

Be it known that I, JOHN W. FLORY, a citizen of the United States, residing at Dayton, in the county of Montgomery and State of Ohio, have invented certain new and useful Improvements in Fireless Cookers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in fireless cookers.

The object of the invention is to provide a cover for a device of this character which will effectually retain the heat on the inside of the receptacle, as hereinafter set forth in the specification and in the subjoined claims.

In the accompanying drawings, Figure 1, is a top plan view of my device, the exterior and interior covers being broken away. Fig. 2, is a cross sectional view through the top of the device. Fig. 3, is an enlarged view through the top of the device on one side, showing the inner cover elevated from its seat.

In a detailed description of the invention, similar reference characters indicate corresponding parts.

The body of the utensil may be circular or oval, and consists of an outer casing 1 and an inner casing 2 suitably spaced to provide a supply of insulating material 1'. The inner casing 2 is adapted to hold the various foods to be cooked after said food has been given a proper amount of initial heat. At the top of the utensil so consisting of the casings 1 and 2, is a horizontal wall which joins the outer and inner casings 1 and 2 and forms the top closure for the space which contains the heat-insulating material 1'. This seat-insulating material as is well known, retains the heat around the body of the receptacle. The inner casing 2 is extended above the horizontal wall 3 and terminates in an inclined seat or portion 4 which joins the horizontal wall 3 a substantial distance from the inner circumference of said wall 3. This inclined or tapered seat 4 will be hereinafter referred to in connection with the cover. Within the casing 2 is a flanged ring 5 provided with a lip 6 which engages the upper edge of the casing 2 and is supported thereon. The ring 5 supports a heat-radiating member 7 at the mouth of the vessel.

The cover for the interior of the vessel consists of two suitably-formed metallic plates 8 which inclose between them a supply of heat-insulating material 8', such as asbestos or the like. The cover so formed has an inner inclined or tapered seat 9 which matches the seat 4 of the inner casing 2, and extending from the lower terminal of said tapered portion 9, is a horizontal portion 8" which matches the horizontal wall 3 lying between the outer and inner casings 1 and 2. When the seats 4 and 9 and the extended portion 8" of the cover engage, there is a valve-like connection between the cover and the mouth of the vessel which effectually prevents the escape of the heat from the interior of the vessel. The central portion of the cover 8 is provided with a housing 14 open at the bottom and seating within which is a valve 15 normally held on its seat by means of a spring above it. In the event that the heat within the vessel or utensil reaches an undesirable point, the valve 15 affords an outlet for such excessive heat. The cover so consisting of the features thus described, is provided with eyes 10 affording means for removing the cover.

11 designates an outer cover which incloses the inner cover 8 and is clamped in position with its down-turned rim inclosing the upper end of the outer casing 1 by means of a bar 12 provided with a handle 13. The said bar 12 is engaged at its end by cleats 16 attached to the outer casing 1. The entire utensil may be conveyed by the handle 13 when the bar 12 engages said cleats.

Having described my invention, I claim:

1. In a fireless cooker, an inner and outer casing inclosing between them heat-insulating material, said inner and outer casings being joined near their upper ends with a horizontal wall, and the inner casing being extended upwardly and terminating in an outward inclined seat which joins said horizontal wall, and a cover consisting of two metallic portions inclosing heat-insulating material, the inner portion of said cover having a tapered seat with a horizontal extension therefrom, said tapered seat and horizontal extension being adapted to engage the tapered seat extending from the inner casing, and the horizontal wall joining said inner and outer casings, substantially as specified.

2. In a fireless cooker, an inner and outer casing joined at their upper ends by a horizontal wall, the inner casing being extended upwardly and terminating in an inclined seat which joins said horizontal wall, and a cover having an inclined seating portion and a horizontal seating portion adapted to engage the inclined seating portion extending from the inner casing, and the horizontal wall joining the inner and outer casings, and means for holding said cover on the seats so provided.

In testimony whereof I affix my signature, in presence of two witnesses.

JOHN W. FLORY.

Witnesses:
MATTHEW SIEBLER,
R. J. McCARTY.